S. HEATH.
PROPELLER PITCH GAGE.
APPLICATION FILED AUG. 14, 1917.
1,263,348.
Patented Apr. 16, 1918.
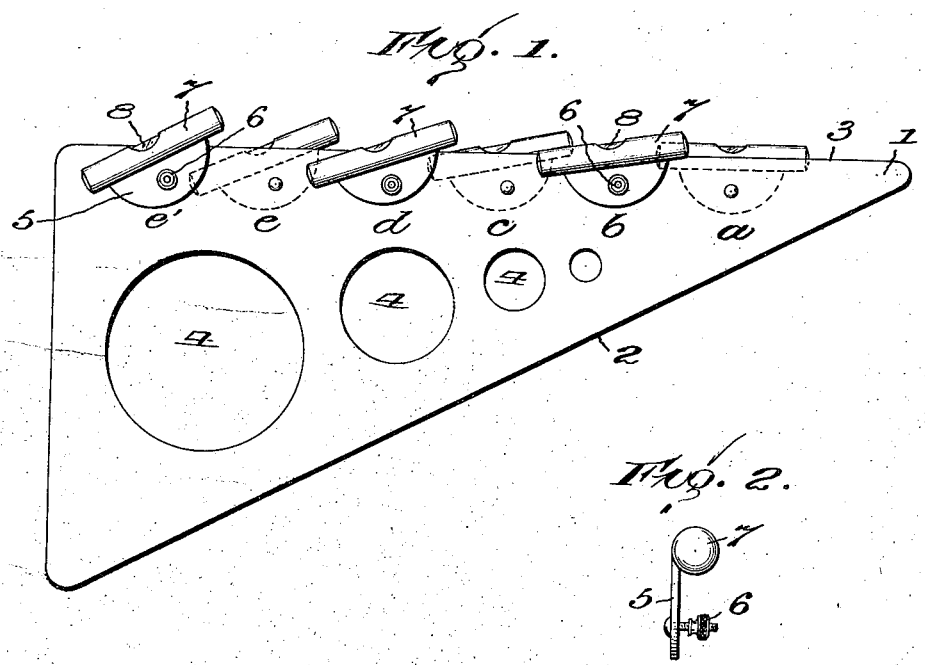
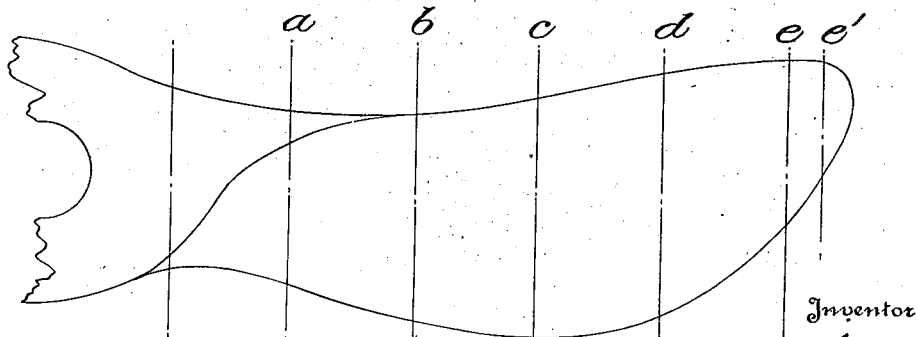

UNITED STATES PATENT OFFICE.

SPENCER HEATH, OF BALTIMORE, MARYLAND, ASSIGNOR TO AMERICAN PROPELLER AND MANUFACTURING COMPANY, A CORPORATION OF MARYLAND.

PROPELLER-PITCH GAGE.

1,263,348.  Specification of Letters Patent.  Patented Apr. 16, 1918.

Application filed August 14, 1917. Serial No. 186,223.

*To all whom it may concern:*

Be it known that I, SPENCER HEATH, a citizen of the United States, residing at Baltimore, and State of Maryland, have invented new and useful Improvements in a Propeller-Pitch Gage, of which the following is a specification.

This invention relates to measuring devices for measuring helical surfaces or other inclined surfaces and pertains particularly to level devices for indicating the inclination of a surface on a propeller blade.

The invention has for its object the production of a device which will provide a plurality of spirit levels so mounted on a plate member that this member may be applied at specified points of a propeller blade to read the inclination at such specified points. The level tubes or devices may be mounted in a row or in any other manner on the support member or plate member which has a measuring edge which may be either a straight side, or provided with two projecting points spaced apart. The degree of inclination of the level devices with respect to the straight side or measuring edge varies gradually in the sequence of level devices. At one end of the sequence the device may show a degree of inclination of 30 degrees while at the opposite end of the plate member the last level device may be mounted in nearly a parallel position with respect to said measuring edge. The structure is provided for the ready application to the surfaces of propeller blades in course of construction and is designed to provide a separate level device for application to specified parts of the propeller spaced off from the axis in a predetermined manner.

Referring to the drawings—

Figure 1 illustrates a side view of a plate member showing the level devices at the upper edge thereof inclined at the various desired increasing angles with respect to the lower side of the plate member;

Fig. 2 is an end view of one of the level devices removed from the plate member and showing the specific outline of the level device with a flat side which makes it possible to attach the level to the plate member and adjust it conveniently thereon;

Fig. 3 represents in outline a propeller blade with certain points indicated where the measuring device would be applied for reading.

Referring in detail to the drawing 1 is a plate member, preferably formed of light but strong metal, having a measuring edge 2 and another edge 3. For the sake of convenience the device is made triangular in shape but this form is not necessarily required. The ratio of inclination of the series of level devices may be changed according to the type or pitch of the propeller to be formed. The plate member is provided with several openings 4 for the insertion of the fingers of the operator. Along the edge 3 are shown six level devices of the type shown in end view in Fig. 2, these being lettered $a$, $b$, $c$, $d$, $e$, and $e'$, the angle of inclination varying in the sequence. The number of devices may be varied according to the number of readings desired on a single propeller blade. For the sake of convenience alternate members are located on opposite sides of the plate member 1. Each level device includes a flat plate member 5 adapted to be clamped to the plate 1 by means of a threaded bolt and screw-nut 6. By loosening and tightening this connecting means 6 the level may be pivoted for different predetermined angles and retightened when the desired angle is reached. At the upper side of each plate member 5 is a tube member 7 containing a spirit level tube 8 such as is well known in the art.

In using this measuring instrument or level to determine the pitch of propeller blades the plate member 1 is applied to the propeller blade with the small end of the plate member 1 at the top of the propeller and with the edge 3 of the plate member held upward. Readings are taken by holding the edge 2 of the plate member in different positions on the propeller blade as indicated by the lines $a$, $b$, $c$, etc., in Fig. 3. The level device lettered $a$ on the plate member should then read horizontal when the operating edge 2 lies on the face of the propeller along the line $a$ (Fig. 3). Similarly other readings are taken. For instance, at position $b$ on the propeller the level device $b$ on the plate member should show a horizontal position. Likewise at position $e$ the level device $e$ on the plate member should show the bubble at its middle point. It is to be understood that the axis of the propeller is by preference vertical, or in other predetermined position when the instrument is used.

The device provides for the plurality of level devices inclined at angles predetermined in accordance with the desired slope of the propeller blade at the various points set off for measurement. The change in the angle conforms to the pitch or contour of the propeller or other helical surface to be measured. The device has been found of great advantage in use of the manufacture of propeller blades for aeroplanes, where the contour of the blade is of the utmost importance and requires the constant application of a level device to the work. The structure has made it possible to avoid great waste of time incident to the laying down and picking of different level devices and to saving in time consumed in adjusting, setting or making other adjustments in devices employing the same level for different positions.

Changes in proportion, relative size and shape of the parts and changes in materials may be made without departing from the scope of the invention.

What I claim is:

1. A pitch test gage for use in shaping helical propeller surfaces, said gage comprising a body portion having a contact edge for engagement with said surfaces at a plurality of predetermined locations along the propeller blade, and a plurality of level devices mounted on said body portion at different predetermined angles corresponding respectively with the desired blade angles at said locations.

2. A pitch test gage for use in shaping helical propeller surfaces, said gage comprising a body portion having a contact edge for engagement with said surfaces at a plurality of predetermined locations along the propeller blade, and a plurality of level devices mounted on said body portion, each level device being adjusted to a different predetermined angle to correspond respectively with the desired blade angles at said locations.

3. A pitch test gage for use in shaping helical propeller surfaces, said gage comprising a body portion having a contact edge for engagement with said surfaces at a plurality of predetermined locations along the propeller blade, and a plurality of level devices mounted in a sequence on said body portion, each progressive level device in said sequence being adjusted to a different predetermined angle to correspond respectively with the desired blade angles at said locations.

4. A pitch test gage for use in shaping helical propeller surfaces, said gage comprising a body portion having a contact edge for engagement with said surfaces at a plurality of predetermined locations along the propeller blade, and a plurality of level devices mounted on said body portion, adjacent level devices being located on opposite sides of said body portion and each level device being adjusted to a different predetermined angle to correspond respectively with the desired blade angles at said location.

In testimony whereof I have hereunto set my hand.

SPENCER HEATH.